United States Patent [19]
White

[11] Patent Number: 5,305,834
[45] Date of Patent: Apr. 26, 1994

[54] ROCK GATHERING TOOL

[76] Inventor: Steve White, 792 Oak Trail Dr., Marietta, Ga. 30062

[21] Appl. No.: 2,317

[22] Filed: Jan. 8, 1993

[51] Int. Cl.$^5$ .............................................. A01B 43/00
[52] U.S. Cl. ........................................ 171/63; 171/144
[58] Field of Search .................. 171/63, 144, 64, 98; 56/328.1

[56]  References Cited
U.S. PATENT DOCUMENTS

| | | | |
|---|---|---|---|
| 976,811 | 11/1910 | Kloss | 171/144 X |
| 3,443,644 | 5/1969 | Schindelka | 171/63 |
| 3,637,024 | 1/1972 | Baskett | 171/63 |
| 3,638,735 | 2/1972 | Denoky | 171/63 |
| 4,040,489 | 8/1977 | Hulicsko | 171/63 |
| 4,296,818 | 10/1981 | Malinowski et al. | 171/63 |
| 4,319,641 | 3/1982 | Degelman | 171/63 |

Primary Examiner—Randolph A. Reese
Assistant Examiner—Christopher J. Novosad
Attorney, Agent, or Firm—Hopkins & Thomas

[57] ABSTRACT

A rock gathering tool (10) for collecting rocks and stones lying on or loosely embedded in the surface of the ground, comprising a rock collection basket having an opening (19) at its front side, a handle (27) fixedly mounted to the basket and extending forwardly of the basket for pulling the basket along the surface of the ground, a plurality of tines (29) mounted to the basket along the bottom edge at the front side of the basket, the plurality of tines extending forwardly of and downwardly from the basket, and a one-way gate (36) for closing the opening at the front side of the basket and which is pivotable inwardly of the basket to allow rocks and stones to enter the basket as the basket is pulled along the ground.

15 Claims, 3 Drawing Sheets

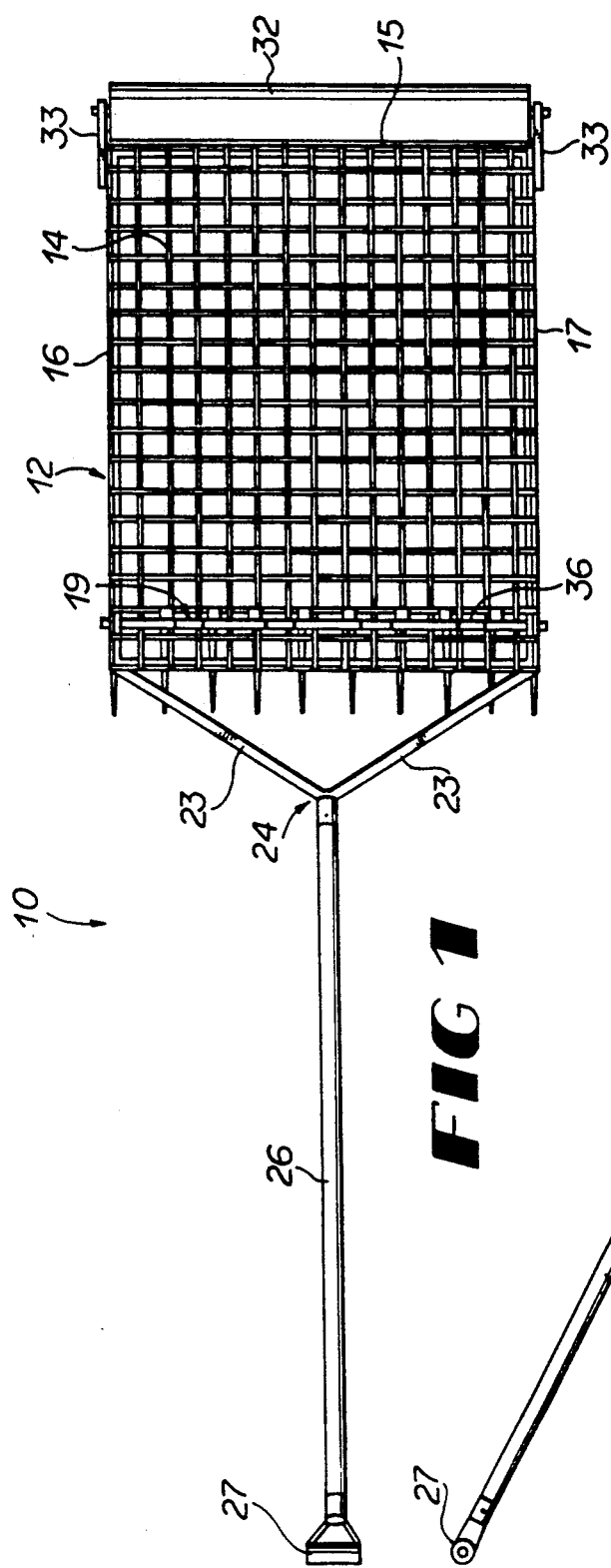
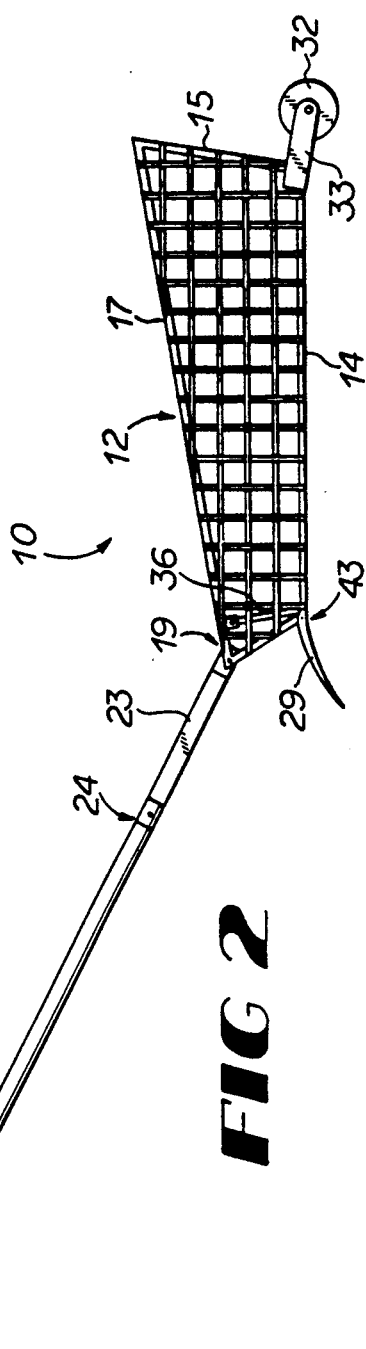

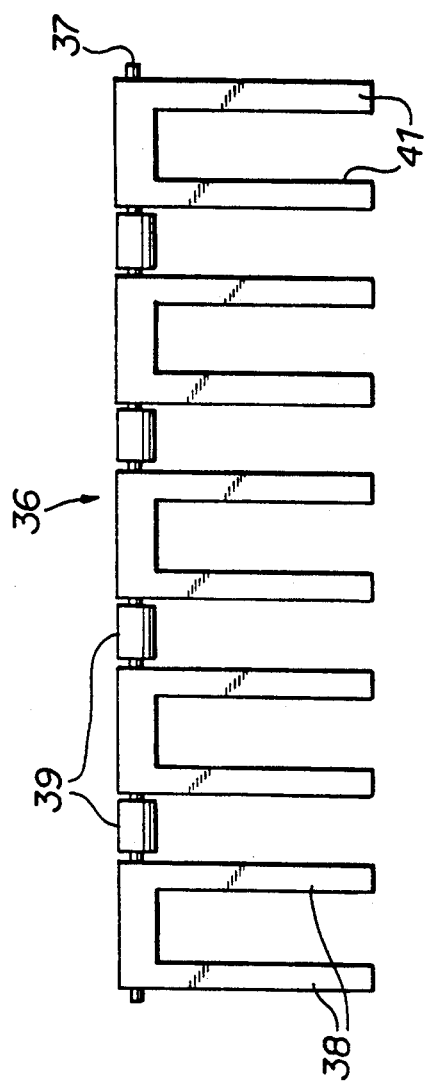
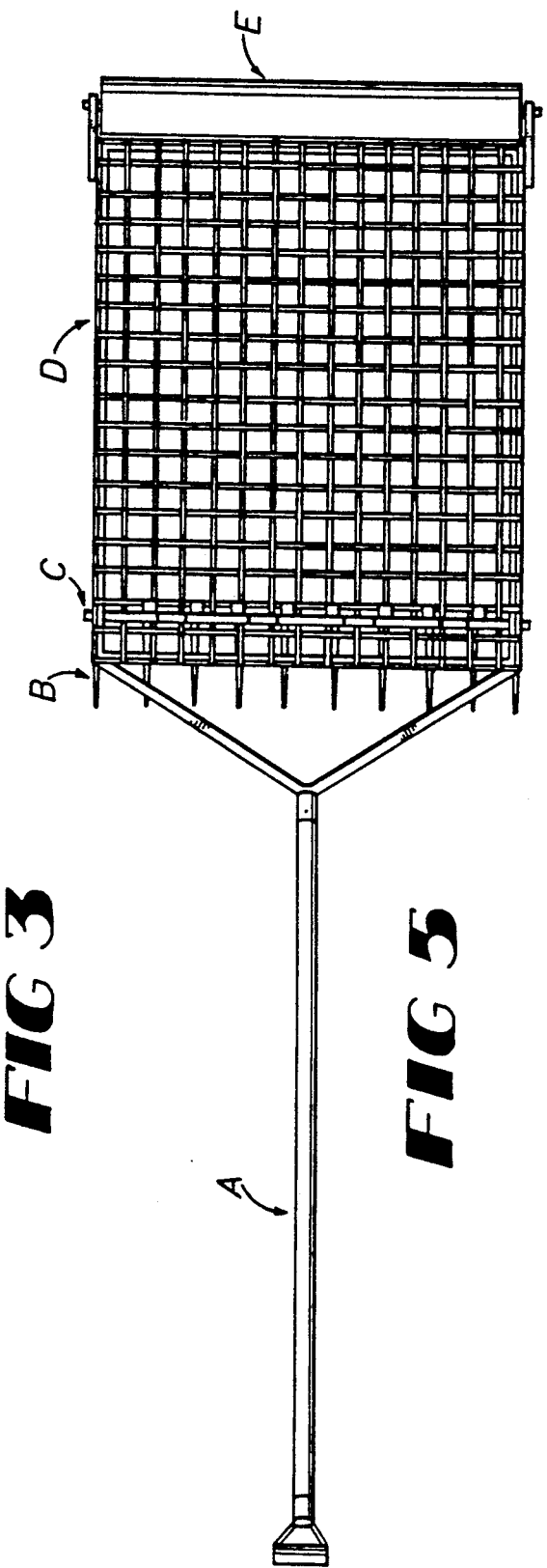

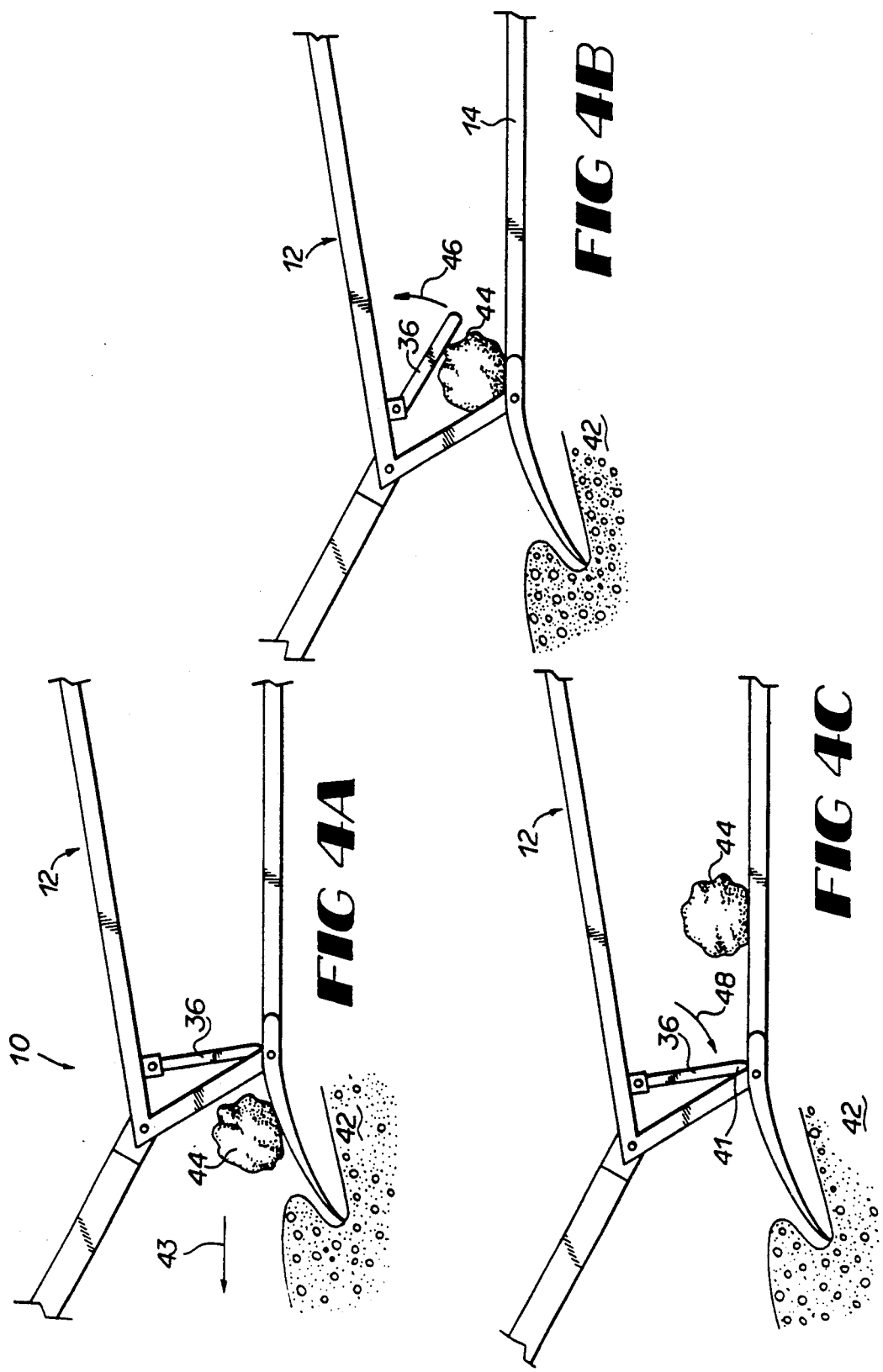

ROCK GATHERING TOOL

FIELD OF THE INVENTION

This invention pertains to an apparatus for gathering rocks and stones lying on or embedded in the surface of the ground in order to clear the surface of rocks or stones of a particular size. More particularly, the present invention pertains to a manually operated rock gathering tool for carrying out this function.

BACKGROUND OF THE INVENTION

Various types of rock gathering devices are commonly employed in the agricultural and commercial sod industries, as well as in other industries and applications where it is necessary to clear rocks and stones from the ground. Such rock gathering devices gather rocks lying at or near the surface of the ground into a hopper or other suitable rock collection basket so that the rocks may be collected and removed from the surface of the ground prior to, for example, the commencement of tillage or sod laying operations. However, for such applications, a rock gathering device must be relatively large to clear large fields of rocks and of sufficient strength to direct rocks of substantial size into the hopper, yet be flexible enough to accommodate immovable objects, such as roots or large rocks.

Many known rock gathering devices typically comprise a large mobile frame supporting a rock collection basket and a stationary fork and rotatable reel assembly positioned ahead of the basket. The reel has a series of rotatable rakes, or reels of tines, for dislodging the rocks and stones from the ground surface. The stationary fork has a grate portion, which together with the rotatable tines, functions to transfer the rocks and stones rearwardly into the rock collection basket.

While such known rock gathering devices are generally well suited for large commercial and agricultural applications, they necessarily are large and complicated in design because they require a separate motor to drive the reel assembly and a tractor to pull the entire device. As such, they are expensive and bulky in size and poorly suited for smaller, simpler applications, such as for clearing residential yards of rocks prior to planting seed.

For such residential and other less demanding applications, it is desirable to have a rock gathering tool that is inexpensive and simple in design, yet which is easy to operate and flexible and mobile enough to get around immovable objects, between objects, and into tight spaces, as is often encountered in common residential applications. Hence, a heretofore unaddressed need exists for an improved rock gathering tool for smaller scale applications that efficiently dislodges and removes rocks embedded or lying along the surface of the ground and collects them for loading into a hopper or other suitable collection means for remote dumping.

SUMMARY OF THE INVENTION

Briefly described, the present invention, is a rock gathering tool for collecting rocks along the surface of the ground, wherein the rock gathering tool is adapted to be manually pulled along the surface of the ground to dislodge and collect the rocks lying therealong. The rock gathering tool comprises, generally, a rock collection basket that is generally rectangular in shape and is constructed of a wire grate framework having parallel or latticed bars for creating a perforated screen or grate so that any dirt or small rocks or pebbles that are collected in the basket can fall through the openings in the grate back onto the surface of the ground. The rock collection basket includes a bottom, two sides, a back wall, and an opening along its front side. The top of the basket is also open; however alternatively, the top could include a top structure such as a lid, for assisting in keeping the rocks within the basket once they are collected.

An elongated handle is mounted to the basket along a upper edge of the front side of the basket. The handle extends forwardly of the basket so that the basket can be pulled along the surface of the ground. A rake, or a plurality of tines, is mounted to the basket along the bottom edge at the front side of the basket. The individual tines extend forwardly of the basket and at an angle downwardly from the basket. Thus, as the basket is pulled along the surface of the ground, the tines dig into the ground and dislodge any rocks loosely embedded therein.

A one-way gate comprising a plurality of individual pairs of fingers or prongs, is pivotally mounted to the basket along the upper edge at the basket's front side. The one-way gate hangs downwardly toward the plurality of tines to close off the opening at the front side of the basket. The prongs of the one-way gate are sufficiently long enough so that their distal ends engage the upper ends of the tines, which prevents the prongs from pivoting past the prongs and outwardly of the basket. Hence, the set of prongs can pivot from a closed position wherein they hang downwardly and close off the front side of the basket to an open position wherein they pivot inwardly of the basket and thereby open the front side of the basket so that rocks dislodged by the tines from the ground can move past the prongs and into the collection basket, yet are prevented from escaping back through the opening at the front side of the basket.

A basket support roller is rotatably mounted at the back side of the basket transversely to the handle. The support roller is mounted at the lower edge of the basket for movably supporting the basket as an operator pulls the basket along the surface of the ground. The basket support roller also functions to smooth the ground behind the basket.

In operation, the rock gathering tool is placed on the ground with the roller supporting the back end of the basket, and with the tines extending downwardly into the ground. An operator then pulls the rock gathering tool by the handle and rakes the surface of the ground, preferably in a back and forth motion. As the rock gathering tool is pulled along the ground, the tines dig into the ground and dislodge any rocks embedded along the surface of the ground. The dislodged rocks, as well as any loose rocks, move past the tines into engagement with the set of prongs of the one-way gate that are pivotally resting along the upper ends of the tines. As the rocks engage the prongs, the prongs pivot inwardly of the basket to their open position allowing the rocks to enter the basket.

After the rocks have been scooped into the basket, the prongs then pivot downwardly to their closed position with their distal ends resting against the tines in order to prevent the collected rocks from escaping out of the basket. When the basket is pushed in a backward motion along the ground, the tines engage embedded rocks in the ground and loosen the rocks, which facilitates gathering the rocks on the forward motion of the basket.

The rock gathering tool is approximately the size of a conventional rake and is constructed primarily of metal to withstand the rigors of common yard work. The size of the rock gathering tool allows it to be easily maneuvered around and within the tight confines commonly encountered in residential yards. Should the tines of the rock gathering tool encounter an immovable object, such as a root or a large rock, the tool can easily be lifted over or maneuvered around the object.

In addition, the position of the plurality of tines between the handle and the basket support roller creates a levered arrangement wherein the degree to which the tines dig into the ground can easily be controlled by adjusting the angle of the handle relative to the ground as the rock gathering tool is pulled along the surface of the ground.

Accordingly, it is an object of the present invention to provide a manually operated rock gathering tool that functions reliably and efficiently to collect rocks lying on or embedded in the surface of the ground.

Another object of the present invention is to provide a manually operated tool for gathering rocks along the surface of the ground that is simple in design and inexpensive to manufacture.

Another object of the present invention is to provide an apparatus for gathering rocks that is rugged in construction and can be easily operated and maneuvered around immovable objects, between objects, and into tight spaces.

Another object of the present invention is to provide a rock gathering tool that can flexibly accommodate immovable objects imbedded in the ground without damaging the rock gathering tool itself.

Another object of the present invention is to provide a rock gathering tool that also functions to smooth out the ground after the rocks have been removed therefrom.

These and other objects, features, and advantages of the present invention will become apparent from the following specification, when read in conjunction with the accompanying drawings.

BRIEF DESCRIPTION OF THE DRAWINGS

FIG. 1 is a plan view of a preferred embodiment of the rock tool of the present invention.

FIG. 2 is a side elevation view of the rock gathering tool of FIG. 1.

FIG. 3 is an enlarged detailed view of the one-way gate of the rock gathering tool of FIG. 1.

FIGS. 4A-4C are a series of detail side elevation views illustrating the operation of the one-way gate as the rock gathering tool of FIG. 1 gathers rocks along the ground.

DETAILED DESCRIPTION

Referring now in more detail to the drawings, in which like numerals represent like parts throughout the several views, FIGS. 1 and 2 illustrate a rock gathering tool 10 constructed in accordance with a preferred embodiment of the present invention. The rock gathering tool 10 comprises a rock collection basket 12 that is generally rectangular in shape and comprises a bottom grate 14, a back grate 15, and two side grates 16, 17. The grates are constructed of a wire grate framework having parallel or latticed bars for creating a perforated screen or grate for holding the rocks. The size of the openings within the grate are not critical to the invention, however, they should be sized slightly smaller than the smallest sized rock that the rock gathering tool 10 is designed to collect. The rock collection basket 12 is open along its top and along its front side, the front side being indicated generally at 19. The opening along the top of the basket allows collected rocks to be easily dumped from the basket, while the opening at the front of the basket is the opening through which the rocks are scooped into the basket, as discussed later.

A pair of brackets 23 are mounted at either side at the front of the rock collection basket 12 and are connected at a junction 24 to which an elongated bar 26 is mounted. A handle 27 for grasping the bar is mounted to the distal end of the elongated bar 26. The elongated bar 26 and handle 27 are fixedly mounted to the basket and extend forwardly therefrom so that the basket can be pulled along the surface of the ground.

A plurality of tines 29 is fixedly mounted to the basket 12 along the front lower edge thereof. The plurality of tines 29 comprises a plurality of spaced parallel tines 30 that extend forwardly of the basket 12 and are angled downwardly below the bottom grate 14 of the basket.

A basket support roller 32 is rotatably mounted between a pair of brackets 33 that extend rearwardly from the sides 16, 17 of the rock collection basket 12. As shown in FIG. 2, the basket support roller 32 rides slightly lower than the bottom grate 14 of the basket 12 in order to support the basket 12 as the rock gathering tool 10 is pulled along the ground.

A one-way gate 36 is mounted between the sides 16, 17 of the rock collection basket 12 at the front side of the basket. As illustrated in FIG. 3, the one-way gate 36 comprises a horizontal support rod 37 that is fixedly mounted between the sides of the rock collection basket, a plurality of pairs of fingers or prongs 38 that are pivotally secured to the horizontal support rod 37, and a set of spacers 39 positioned between the pairs of prongs 38. Each pair of prongs 38 is loosely coiled around the horizontal support rod 37, which allows the pair of prongs to pivot freely about the rod. The spacers 39 keep the prongs properly distanced from each other along the length of the one-way gate. In addition, the pairs of prongs 38 are adapted to pivot about the horizontal support rod 37 independently of the other pairs of prongs. This arrangement allows the prongs to pivot inwardly of the basket independently of each other as a rock engages a particular pair of prongs.

The prongs 38 extend from the horizontal support rod 37 a distance sufficient so that their distal ends 41 engage the upper ends of the tines 29, as indicated at 43 in FIG. 2. As shown in FIG. 2, the one-way gate 36 is in its closed position, wherein the front side 19 of the rock collection basket 12 is closed by the gate so that any rocks collected within the basket cannot escape through the opening in the front. The one-way gate 36 is adapted to pivot upwardly to the right, as shown in FIG. 2, to allow rocks to move up over the tines and into the rock collection basket 12.

The one-way gate 36, as discussed herein, is one of many embodiments of a suitable means for allowing rocks into the basket and preventing rocks from escaping through the front of the basket once the rocks are collected therein. Other arrangements can function equally well in accomplishing this purpose. For example, a lip could be provided along the upper portion of the tines, wherein the top of the lip is appreciably higher than the bottom grate of the basket. Such an arrangement would allow rocks to move over the lip and into the basket, yet would create a shoulder for preventing rocks from escaping the basket.

In operation, the rock gathering tool 10 is placed top side up on the ground with the basket support roller 32 supporting the back end of the rock collection basket 12 and with the plurality of tines 29 slightly dug into the top of the ground. An operator grabs the handle 27 and pulls the rock gathering tool 10 along the ground so that the plurality of tines rakes through the ground and dislodges any rocks or stones embedded in the surface of the ground. As the rock collection tool 10 is pulled along the surface of the ground, the basket 12 scoops the dislodged rocks and any rocks lying along the surface of the ground so that the rocks engage the one-way gate 36 and open the individual prongs 38 and move into the rock collection basket.

FIGS. 4A-4C detail a sequence of movements of the one-way gate 36 as a rock is scooped into the rock collection basket 12. In FIG. 4A, the rock gathering tool 10 is pulled along the surface of the ground 42 in the direction of arrow 43. A rock 44, either lying on the surface of the ground or embedded therein, is dislodged from the surface by the tines, and the rock collection basket 12 moves around the rock 44 so that the rock engages one or more prongs of the one-way gate 36. As the rock 44 engages the gate 36, as illustrated in FIG. 4B, the one-way gate 36 pivots rearwardly in the direction of arrow 46 inwardly of the rock collection basket 12. This allows the rock to move into the rock collection basket 12. Any loose dirt or smaller stones that are also collected within the rock collection basket simply fall through the openings in the bottom grate 14 of the rock collection basket back onto the surface of the ground 42. As illustrated in FIG. 4C, after the rock 44 is collected within the rock collection basket 12, the one-way gate 36 falls by gravity downwardly in the direction of arrow 48 to close the one-way gate, in which position the distal ends 41 of the prongs engage the upper ends of the tines 29, thereby preventing any collected rocks from escaping through the opening in the front side of the basket.

The position of the plurality of tines 29 between the basket support roller 32 and the handle 27 creates a levered arrangement that allows the depth of the tines within the ground to be easily controlled. As the rock gathering tool 10 is pulled along the surface of the ground, should the tines begin to dig too deeply into the ground, or should the tines get caught on a rock or a root, the operator need only to lift up on the handle to raise the tines to the desired level, or over the rock or root, as the case may be. Likewise, if the tines are not digging far enough into the ground, the operator can easily adjust the angle of the handle downwardly. Consequently, the rock gathering tool is easily controlled and maneuvered around immovable objects and can easily accommodate such objects when encountered.

Accordingly, it can be seen that an improved rock gathering tool is provided that is simple in design and can be inexpensively manufactured, yet which reliably and efficiently functions to collect rocks along the surface of the ground, and which is compact and can easily be manually operated to maneuver around and between immovable objects, as well as into tight confines.

The features and principles of the present invention have been illustrated in the foregoing description of a preferred embodiment thereof. It will be apparent to those skilled in the art that numerous changes or modifications may be made thereto without departure from the spirit and scope of the invention.

I claim:

1. A rock gathering tool for collecting rocks from the surface of the ground, comprising
   a basket including an opening along its front side through which the rocks can enter the basket,
   a plurality of tines mounted to a bottom edge of the basket below the opening along the front side of the basket, the tines extending forwardly and at an angle downwardly from the basket,
   a handle mounted to the basket for pulling the basket along the ground,
   a plurality of fingers pivotally mounted to an upper edge of the basket above the opening along the front side of the basket, the fingers being movable between a closed position wherein they close off the opening to contain the rocks within the basket and an open position wherein they extend inwardly of the basket to allow the rocks to enter the basket, and
   means for preventing the fingers from pivoting outwardly of the basket,
   whereby, as the rock gathering tool is pulled along the surface of the ground, the plurality of tines extends into the ground and dislodges rocks embedded along the surface of the ground, the rocks engage the fingers and move them to their open position, and the rocks move into the basket and the fingers pivot back to their closed position.

2. The rock gathering tool of claim 1, wherein the means for preventing the fingers from pivoting outwardly of the basket comprises the fingers being aligned above the tines and the fingers being sufficiently long to engage the tines and stop the fingers as they pivot to their closed position.

3. The rock gathering tool of claim 1, and further comprising a support roller rotatably mounted to the basket for movably supporting the basket as the basket is pulled along the surface of the ground.

4. The rock gathering tool of claim 3, wherein the plurality of tines is positioned between the handle and the support roller.

5. The rock gathering tool of claim 1, wherein the plurality of fingers are independently mounted to the upper edge of the basket so that only the fingers engaged by a rock pivot inwardly of the basket.

6. A rock gathering tool for collecting rocks or the like from the surface of the ground, comprising
   a basket including a bottom, two sides, a back side, and an opening along its front side,
   a handle mounted to the basket and extending forwardly therefrom for pulling the basket along the surface of the ground,
   a plurality of tines mounted along a bottom edge of the basket below the opening in the front side of the basket, the tines projecting at an angle downwardly and forwardly from the basket, and
   a one-way gate mounted to the basket for closing the opening in the front side of the basket, the one-way gate being movable from its closed position to an open position wherein the gate extends inwardly of the basket so that rocks can enter the basket through the opening of the front side of the basket,
   whereby, as the rock gathering tool is pulled along the ground, the tines extend into the ground and lift rocks from the ground, and the rocks move past the one-way gate and into the basket.

7. The rock gathering tool of claim 6, wherein the one-way gate comprises a plurality of individual one-way gates, each gate being able to open and close independently of the other gates.

8. The rock gathering tool of claim 6, wherein the one-way gate is loosely, pivotally mounted to the basket so that the one-way gate is movable by gravity to its closed position.

9. The rock gathering tool of claim 8, wherein the one-way gate comprises a series of prongs, which extend from an upper edge of the basket, the distal ends of the prongs adapted to engage the tines and stop the prongs when they move to their closed position, thereby preventing the prongs from pivoting outwardly of the basket.

10. The rock gathering tool of claim 6, and further comprising a support roller rotatably mounted to the basket for movably supporting the basket as the basket is pulled along the ground.

11. The rock gathering tool of claim 10, wherein the plurality of tines are positioned between the support roller and the handle.

12. A rock gathering tool for collecting rocks or the like from the surface of the ground, comprising
 a basket including a bottom, two sides, a back side, and an opening along its front side, the opening being sized sufficiently large so that rocks can move through the opening and into the basket,
 a handle mounted to the basket and extending forwardly therefrom for pulling the basket along the surface of the ground,
 a plurality of tines mounted along a bottom edge of the basket below the opening in the front side of the basket, the tines projecting at an angle downwardly and forwardly from the basket, and
 means for preventing collected rocks from escaping through the opening in the front of the basket,
 whereby, as the rock gathering tool is pulled along the ground, the tines extend into the ground and lift rocks from the ground, and the rocks move over the tines and through the opening in the front of the basket and are collected within the basket.

13. The rock gathering tool of claim 12, wherein the means for preventing collected rocks from escaping through the opening in the front of the basket comprises a one-way gate mounted to the basket for closing the opening in the front side of the basket, the one-way gate being movable from its closed position to an open position wherein the gate extends inwardly of the basket so that rocks can enter the basket through the opening of the front side of the basket.

14. The rock gathering tool of claim 13, wherein the one-way gate comprises a plurality of individual one-way gates, each gate being able to open and close independently of the other gates.

15. The rock gathering tool of claim 14, wherein the one-way gate is loosely, pivotally mounted to the basket so that the one-way gate is movable by gravity to its closed position.

* * * * *